(12) United States Patent
Freedman et al.

(10) Patent No.: US 11,131,824 B2
(45) Date of Patent: Sep. 28, 2021

(54) ALIGNMENT OF AN OPTICAL SYSTEM

(71) Applicant: INTEL CORPORATION, Santa Clara, CA (US)

(72) Inventors: Barak Freedman, Yokneam (IL); Adi Shechtman, Nofit (IL)

(73) Assignee: Intel Corporation, Santa Clara, CA (US)

( * ) Notice: Subject to any disclaimer, the term of this patent is extended or adjusted under 35 U.S.C. 154(b) by 1296 days.

(21) Appl. No.: 14/865,360

(22) Filed: Sep. 25, 2015

(65) Prior Publication Data

US 2017/0090142 A1  Mar. 30, 2017

(51) Int. Cl.
| | |
|---|---|
| *B32B 41/00* | (2006.01) |
| *G02B 7/00* | (2021.01) |
| *G02B 7/02* | (2021.01) |
| *G01J 1/02* | (2006.01) |
| *G02B 27/62* | (2006.01) |

(52) U.S. Cl.
CPC ............ *G02B 7/003* (2013.01); *G01J 1/0266* (2013.01); *G02B 7/005* (2013.01); *G02B 7/02* (2013.01); *G02B 7/025* (2013.01); *G02B 27/62* (2013.01)

(58) Field of Classification Search
CPC .......... G02B 7/003; G02B 7/02; G01J 1/0266
USPC ................... 156/60, 64, 350, 351, 378, 379
See application file for complete search history.

(56) References Cited

U.S. PATENT DOCUMENTS 5,687,032 A * 11/1997 Takeshita ........... G11B 7/00718
359/819
6,320,706 B1 * 11/2001 Richard ................. G02B 7/003
359/819

* cited by examiner

Primary Examiner — Michael N Orlando
Assistant Examiner — Joshel Rivera
(74) Attorney, Agent, or Firm — Hanley, Flight & Zimmerman, LLC

(57) ABSTRACT

A method and apparatus for actively aligning an optical device are described. An apparatus includes an optical device. The optical device includes a supporting surface, a light source mounted to the supporting surface, a lens mount configured to hold a lens, a lens holder configured to hold the lens mount, wherein the lens mount is configured to be mounted to the supporting surface. A light detector is configured to determine a light intensity of a light beam through the lens, the light intensity indicating the alignment of the lens. An alignment device is to move the lens until the light intensity indicates that the lens is aligned, and a curing light is to cure adhesive layers between the lens and the lens mount, the lens mount and the lens holder, and the lens holder and the supporting surface.

25 Claims, 6 Drawing Sheets

200

500

ALIGNMENT OF AN OPTICAL SYSTEM

TECHNICAL FIELD

The present techniques relate generally to optical devices. More specifically the present techniques relate to the alignment of optical systems that are fixed in place by adhesives.

BACKGROUND

An important design consideration in the construction of optical systems is the alignment of the various optical components and the stability and reliability of the alignment during the product life cycle. Miniaturized optical systems often require a highly accurate assembly and alignment, down to a micron or sub-micron accuracy.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The accurate assembly of optical devices may include building highly accurate parts and using high precision passive placement. Another approach is to use active alignment, for example, operating the optical system and aligning the parts using feedback from the system, such as light intensity or focus, among others.

Active alignment generally uses a large travel range for the optical components. A large travel range means that for active alignment a large amount of glue is used to hold the optical parts in place. For example, a travel range of about 200 micrometers (μm) may use a glue layer of up to 200 μm. Such a large amount of glue may be problematic for an optical system. For example, the alignment may be good when initially performed, but changes in the dimensions of the glue layer with temperature may cause the alignment to be lost.

In techniques described herein, a mechanism is used to allow free movement of the optical component in six degrees of freedom, for example, X, Y, Z, and rotations in the x-plane, y-plane, and z-plane. The mechanism lowers the gaps used for adhesives to a few micrometers, e.g., less than about 25 micrometers, less than about 20 micrometers, or less than about 15 micrometers.

Figure 1:
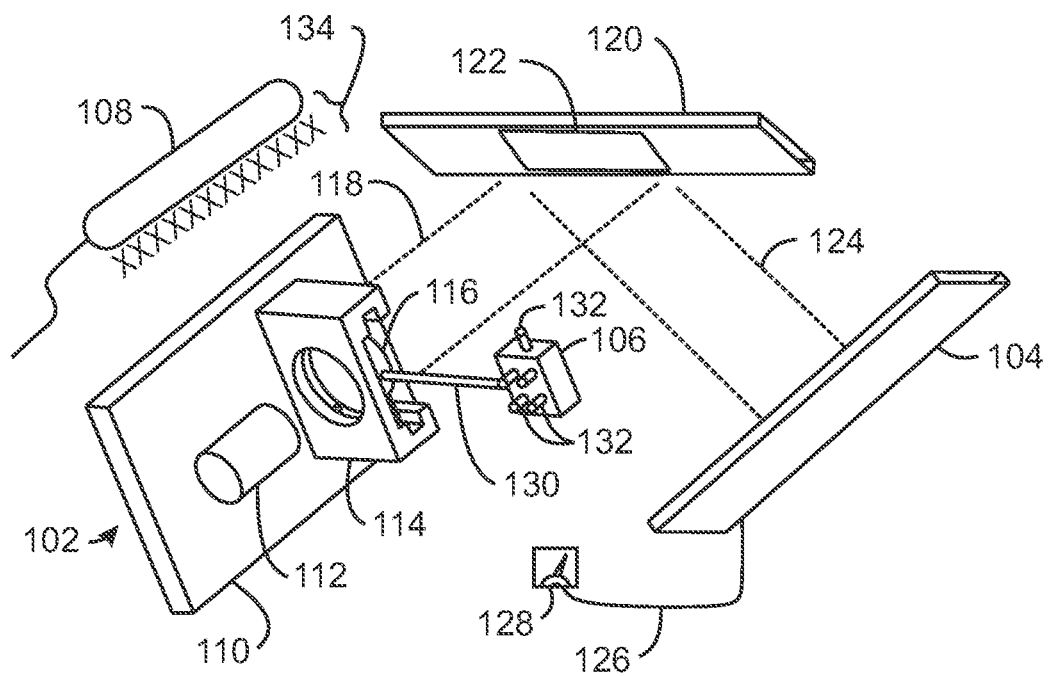
FIG. 1 is a schematic of an apparatus that may be used to actively align an optical device.

FIG. 1 is a schematic of an apparatus 100 that may be used to actively align an optical device 102. The apparatus 100 includes the optical device 102, a light detector 104, an alignment device 106, and a curing light 108.

The optical device 102 includes a supporting surface 110, e.g., an optical bench, to which other parts may be mounted. The supporting surface 110 may also include an interior surface of a case, an optical bench mounted to an interior surface of a case, or any number of other surfaces that may provide a stable surface for mounting the parts.

A light source 112 may be mounted to the supporting surface 110, for example, with an adhesive. Adhesives that may be used include light cured acrylic adhesives, light cured cyanoacrylate adhesives, light cured epoxy adhesives, and the like. The light source 112 may be a light emitting diode (LED), a laser diode, an IR LED, and the like.

A lens holder 114 may be placed along the supporting surface 110, using an uncured adhesive to hold the lens holder 114 in place before a cure. The lens holder 114 holds a lens mount (described with respect to FIG. 2), in which a lens 116 is placed. The lens mount may be held in place in the lens holder 114 with another layer of adhesive. The lens 116 may also be held in place in the lens mount with an adhesive layer.

A collimated light beam 118 may be emitted from the lens 116 and directed towards a target 120. The target 120 may include any number of different items, such as a microelectromechanical system (MEMS) device 122, a mirror, a sample, or any number of other items. For example, the MEMS device 122 may include a scanning mirror, a digital light processor, and the like. In some examples, the light detector 104 may be used in place of the target 120 for purpose of the alignment.

A reflected light beam 124 from the target 120 may impinge on the light detector 104. A signal line 126 from the light detector 104 may be used to provide a display 128 of the signal intensity from the light detector 104. The signal line 126 may be coupled to the alignment device 106 in addition to, or instead of, the display 128 to allow for automation of the active alignment process.

An alignment post 130 may be coupled from the alignment device 106 to the lens 116, for example, being mounted to the lens 116 with a removable adhesive. In this example, the alignment post 130 may couple to the mechanism of the alignment device 106 to allow the post to be moved along the x, y, and z axis, or to be rotated in the x, y, and z planes. This may be performed by turning knobs 132 on the alignment device 106. The knobs 132 may turn gears that move the alignment post 130 in the desired direction. The alignment post 130 then moves the lens 116, which also moves the lens mount, and lens holder 114. The alignment post 130 may be coupled to other points instead of, or in addition to, the lens 116, such as the lens holder 114.

In place of the knobs 132, the alignment device 106 may use motors to automate the process. Suitable alignment devices 106 may be available from, or adapted from instruments available from, commercial vendors, such as Physik Instrumente (PI) GmbH & Co. KG of Karlsruhe, Germany, or Thorlabs Inc. of Newtown, N.J. As an example, the 6-Axis NanoMax™ NanoPositioning Flexure Stages available from Thorlabs may be used as the alignment device 106.

Once the optical alignment is completed, for example, as indicated by a maximum in the light intensity from the light detector 104, the adhesive may be cured to fix the parts in place. This may be performed by activating a curing light 108 that emits a light 134 at a frequency that initiates a curing process in the adhesive upon exposure to the light. This may be in the blue light range, e.g., light with a wavelength of about 450 nm or less, or in the ultraviolet (UV) light range, e.g., with a wavelength of about 275 nm or less. Curing may be assisted or completed by heating the parts, for example, to about 50° C. Once curing is completed, the alignment post 130 may be detached from the lens 116.

The techniques described herein are not limited to using a light intensity to indicate alignment. In some examples, a pattern of an emitted light beam may be compared to an aligned pattern to indicate alignment. In this case, the lens may be moved until the pattern matches the aligned pattern, e.g., a beam comes into focus, or forms a circular pattern.

Figure 2:
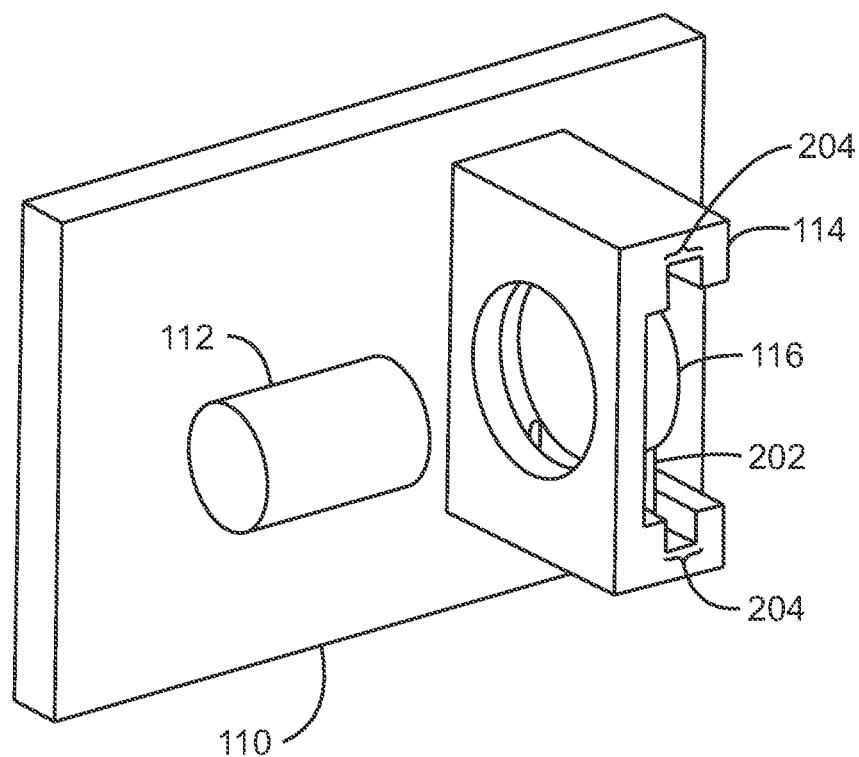
FIG. 2 is a closer view of the lens holder of FIG. 1.

FIG. 2 is a closer view 200 of the lens holder 114 of FIG. 1. Like numbered items are as described with respect to FIG. 1. In this drawing, a lower portion of the lens mount 202 is visible. An upper portion of the lens mount 202 is hidden in this view. In some embodiments, the lens mount 202 may be two separate pieces on each side of the lens 116. The lens mount 202 may be a single unit, for example, with a round center section having an indented hole or slot to hold the lens 116, and two tabs, one projecting upward from the lens 116, and one projecting downward from the lens 116. The tabs fit into the slots 204 in the lens holder 114, allowing the lens mount 202 to be slid into the lens holder 114.

Figure 3:
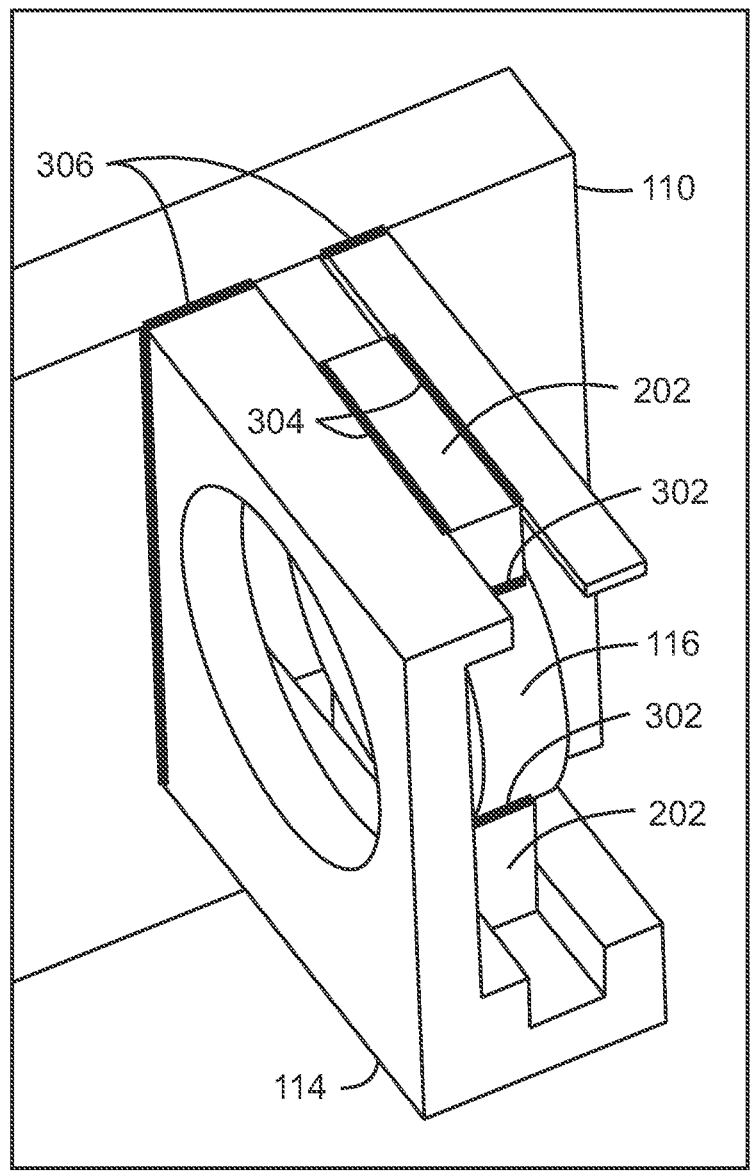
FIG. 3 is a cross sectional view showing the adhesive layers that may fix the parts in place.

FIG. 3 is a cross sectional view 300 showing the adhesive layers that may fix the parts in place. As shown in FIG. 3, a lens adhesive layer 302 may be used to hold the lens 116 to the lens mount 202. A mount adhesive layer 304 may be used to hold the lens mount 202 to the lens holder 114. Further, a support adhesive layer 306 may be used to hold the lens holder 114 to the supporting surface 110.

The adhesive used in the adhesive layers 302, 304, and 306 may include any number of photocurable adhesives available from various sources. For example, the adhesive may be a BlueWave® LED Prime UVA high-intensity spot-curing adhesive from Dymax® Corporation of Torrington, Conn. Other suitable adhesives may be available from Henkel Corporation under the Loctite® brand, and may include photocurable acrylic adhesives, photocurable epoxies, and the like.

The adhesive layers 302, 304, and 306 may be the same or different materials, depending on the stresses of the application. For example, the support adhesive may be a more viscous material to hold the lens holder 114 in place before curing.

The adhesive layers 302, 304, and 306 may generally be about 10 to about 25 micrometers or about 15 micrometers in thickness, providing a small amount of motion in each of a number of degrees of freedom. Upon curing, this provides adhesive layers 302, 304, and 306 with a very low thickness. The low thickness of the adhesive layers 302, 304, and 306 will decrease the changes due to thermal expansion and contraction, making the optical alignment more reliable over time.

As described herein, the motions used for the alignment include six degrees of freedom. Three of the motions are translations along an axis, and three of the motions are rotations about an axis. These motions are shown more clearly in FIGS. 4A-4F.

Figure 4C:
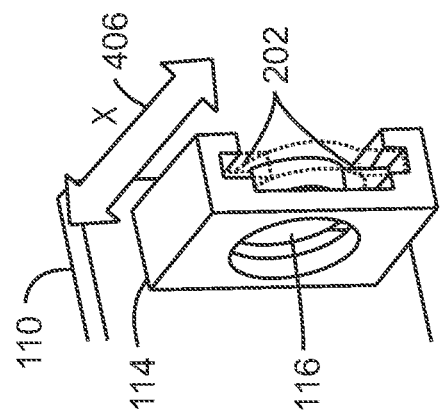
FIG. 4C is a drawing of a motion of a group of optical parts that may be used for alignment.
Figure 4B:
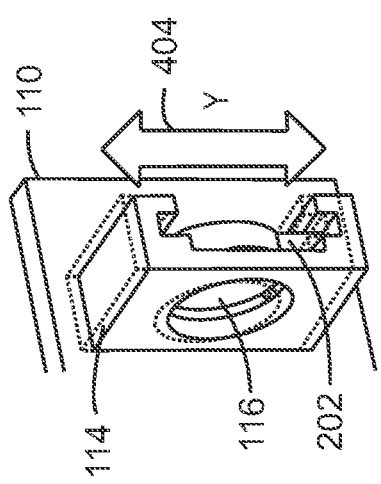
FIG. 4B is a drawing of a motion of a group of optical parts that may be used for alignment.
Figure 4A:
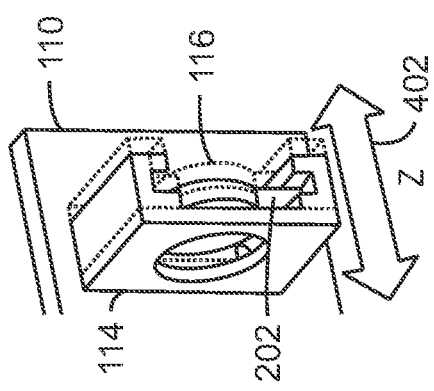
FIG. 4A is a drawing of a motion of a group of optical parts that may be used for alignment.

FIG. 4A is a drawing of a motion of a group of optical parts that may be used for alignment. Like numbered items are as described with respect to FIGS. 1 and 2. The optical parts include the lens 116, the lens mount 202, and the lens holder 114, while the motion is relative to the supporting surface 110. This drawing illustrates a translation of the lens holder 114 along the z-axis 402, e.g., towards or away from the light source.

FIG. 4B is a drawing of a motion of a group of optical parts that may be used for alignment. Like numbered items are as described with respect to FIGS. 1 and 2. This drawing illustrates a translation of the lens holder 114 along the y-axis 404, e.g., upwards or downwards relative to the light source.

FIG. 4C is a drawing of a motion of a group of optical parts that may be used for alignment. Like numbered items are as described with respect to FIGS. 1 and 2. As the lens holder 114 remains close to the supporting surface, e.g., within about 15 micrometers, translation along the x-axis 406 is performed by sliding the lens mount 202 and lens 116 in the lens holder 114 towards or away from the supporting surface 110.

Figure 4F:
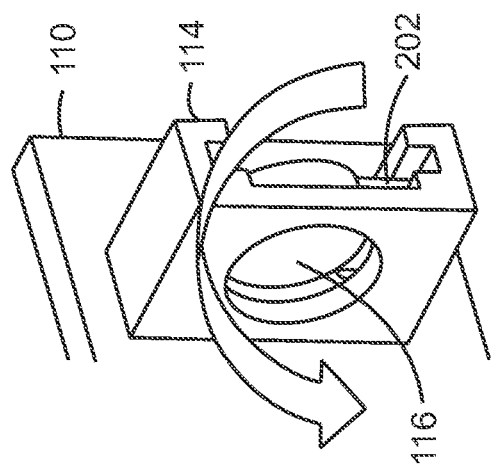
FIG. 4F is a drawing of a motion of a group of optical parts that may be used for alignment.
Figure 4E:
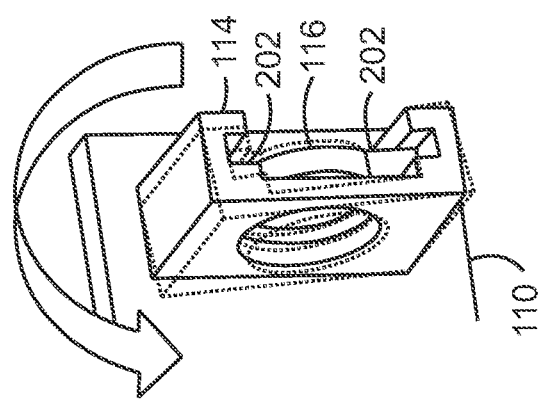
FIG. 4E is a drawing of a motion of a group of optical parts that may be used for alignment.
Figure 4D:
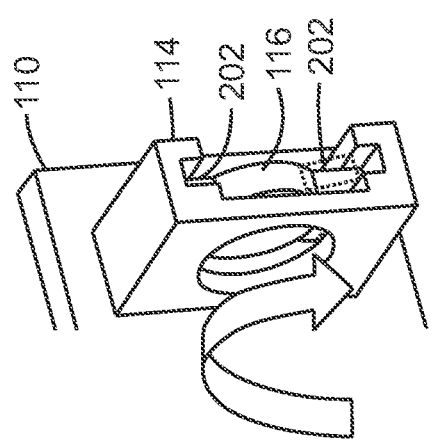
FIG. 4D is a drawing of a motion of a group of optical parts that may be used for alignment.

FIG. 4D is a drawing of a motion of a group of optical parts that may be used for alignment. Like numbered items are as described with respect to FIGS. 1 and 2. This drawing illustrates a rotation of the lens mount 202 in the lens holder 114 in a plane in the x-axis 406. The rotation may also include a rotation of the lens 116 in the lens mount 116.

FIG. 4E is a drawing of a motion of a group of optical parts that may be used for alignment. Like numbered items are as described with respect to FIGS. 1 and 2. This drawing illustrates a rotation of the lens holder 114 in a plane in the z-axis 402.

FIG. 4F is a drawing of a motion of a group of optical parts that may be used for alignment. Like numbered items are as described with respect to FIGS. 1 and 2. In addition to a rotation of the lens holder 114 in the z-axis 402, the lens 116 itself may be rotated in a plane in the z-axis 402. This may be used in cases in which the lens 116 is spherical.

The motions shown in FIGS. 4A-4F may be used to maximize the intensity of a light signal, or to optimize other measures of alignment. For example, the light detector 104 may be used to capture an image of the collimated light beam 118 or reflected light beam 124. The shape of the image may be used to control the alignment, e.g., by adjusting the motion until the image is more nearly circular than oblong, among others.

Figure 5:
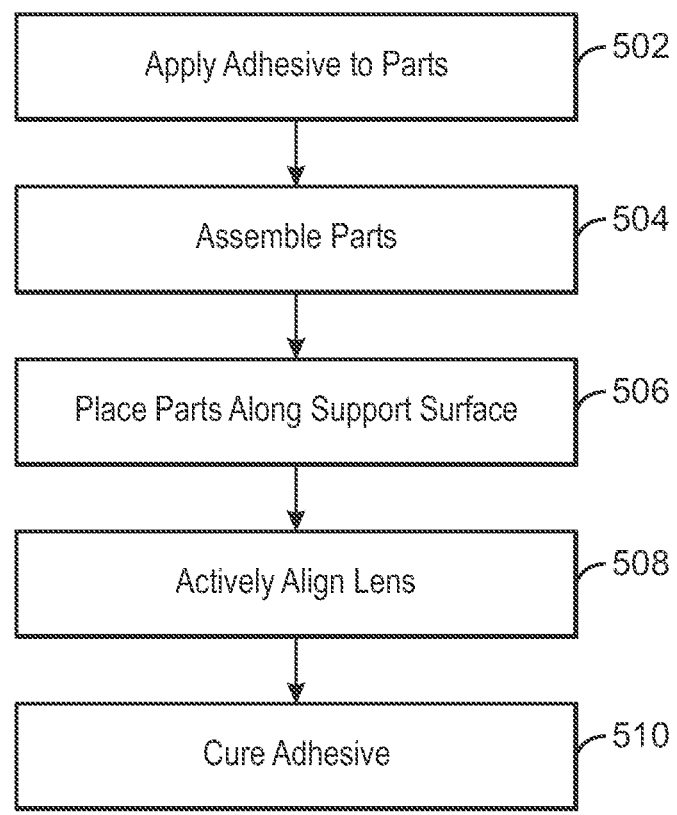
FIG. 5 is a block diagram of a method to actively align an optic device.

FIG. 5 is a block diagram of a method 500 to actively align an optical device. The method 500 may begin at block 502 with the application of the adhesive to the parts, such as the lens, the lens mount, and the lens holder. The parts are then assembled at block 504. This may be performed in sequential operations for each of the parts, for example, first applying an uncured adhesive to a lens and placing the lens in a lens mount. Then applying an uncured adhesive to the lens mount and placing the lens mount in a lens holder. This is followed by applying an uncured adhesive to the lens holder and placing the lens holder on the supporting surface. At block 506, the parts are placed along the supporting surface.

At block 508, the parts are actively aligned. As described herein, this may be performed by attaching an alignment device to the lens or lens holder, and moving the lens as described herein until an optical signal reaches a target level. The target level may be indicated by a signal intensity level, an image shape, an image focus, and the like.

At block 510, the adhesive is cured to fix the parts in place. As described herein, the curing may be performed by exposing the adhesive to a UV light, a blue light, heat, or any combinations thereof.

EXAMPLES

Example 1 includes an apparatus for actively aligning an optical device. The apparatus includes an optical device, a light detector, an alignment device, and a curing light. The optical device includes a supporting surface, a light source mounted to the supporting surface, a lens mount configured to hold a lens, and a lens holder configured to hold the lens mount, wherein the lens mount is configured to be mounted to the supporting surface. The light detector is configured to determine a light intensity of a light beam through the lens, wherein the light intensity indicates the alignment of the lens. The alignment device moves the lens until the light intensity indicates that the lens is aligned. The curing light cures adhesive layers between the lens and the lens mount, the lens mount and the lens holder, and the lens holder and the supporting surface.

Example 2 incorporates the subject matter of Example 1. In this example, the adhesive layers are less than about 25 micrometers in thickness.

Example 3 incorporates the subject matter of any of Examples 1 to 2. In this example, the lens is configured to be moved in the lens mount during alignment.

Example 4 incorporates the subject matter of any of Examples 1 to 3. In this example, the lens mount is configured to be moved in the lens holder during alignment.

Example 5 incorporates the subject matter of any of Examples 1 to 4. In this example, the lens holder is configured to be moved vertically along the supporting surface.

Example 6 incorporates the subject matter of any of Examples 1 to 5. In this example, the lens holder is configured to be moved horizontally along the supporting surface.

Example 7 incorporates the subject matter of any of Examples 1 to 6. In this example, the lens holder is configured to be rotated along the supporting surface.

Example 8 incorporates the subject matter of any of Examples 1 to 7. In this example, the curing light is a blue light.

Example 9 incorporates the subject matter of any of Examples 1 to 8. In this example, the curing light is an ultraviolet light.

Example 10 incorporates the subject matter of any of Examples 1 to 9. In this example, the apparatus either of claim 1 or 2, wherein the adhesive layers are cured by a combination of light and heat.

Example 11 incorporates the subject matter of any of Examples 1 to 10. In this example, the apparatus either of claim 1 or 2, wherein the alignment is determined by a maximum in the light intensity.

Example 12 includes a method for actively aligning a lens in an optical device. The method includes applying an uncured adhesive to parts of the optical device, assembling the parts, and placing the assembled parts along a supporting surface. The lens is actively aligned, wherein the parts move in six degrees of freedom during the alignment and the uncured adhesive is cured to fix the parts of the optical assembly to each other and to the supporting surface.

Example 13 incorporates the subject matter of Example 12. In this example, the method includes applying the uncured adhesive to a lens, placing the lens in a lens mount, applying the uncured adhesive to the lens mount, placing the lens mount in a lens holder, applying the uncured adhesive to the lens holder, and placing the lens holder on the supporting surface.

Example 14 incorporates the subject matter of any of Examples 12 to 13. In this example, actively aligning the lens includes attaching an alignment device to the lens, starting a light source, measuring an intensity of a light from the light source with a detector, and moving the lens with the alignment device until the intensity of the light is maximized.

Example 15 incorporates the subject matter of any of Examples 12 to 14. In this example, actively aligning the lens includes attaching an alignment device to the lens, starting a light source, and moving the lens with the alignment device until a pattern of an emitted light beam matches an aligned pattern.

Example 16 incorporates the subject matter of any of Examples 12 to 15. In this example, the method includes irradiating the uncured adhesive with a blue light to cure the uncured adhesive.

Example 17 incorporates the subject matter of any of Examples 12 to 16. In this example, the method includes irradiating the uncured adhesive with an ultraviolet light to cure the uncured adhesive.

Example 18 incorporates the subject matter of any of Examples 12 to 17. In this example, the method includes irradiating the uncured adhesive with light to start a curing process, and applying heat to finish the curing process.

Example 19 includes an optical device. The optical device includes a supporting surface, a light source mounted to the supporting surface, a lens mount configured to hold a lens, wherein the lens mount is configured to allow the lens to rotate in the lens mount. A lens holder is configured to hold the lens mount. The lens mount is configured to be mounted to the supporting surface. The lens holder is configured to allow the lens mount to shift in the lens holder, and is configured to shift along the supporting surface. A lens adhesive layer is between the lens and the lens mount. A mount adhesive layer is between the lens mount and the lens holder. A support adhesive layer is between the lens holder and the supporting surface. When uncured, the lens adhesive layer, the mount adhesive layer, and the support adhesive layer adhesive layer hold parts in place.

Example 20 incorporates the subject matter of Example 19. In this example, a light detector is configured to determine a light intensity of a light beam through the lens, the light intensity indicating an alignment of the lens. An alignment device is to move the lens until the light intensity indicates that the lens is aligned. A curing light is to cure the lens adhesive layer, the mount adhesive layer, and the support adhesive layer.

Example 21 incorporates the subject matter of any of Examples 19 to 20. In this example, the lens adhesive layer, the mount adhesive layer, and the support adhesive layer are each less than about 25 micrometers in thickness.

Example 22 incorporates the subject matter of any of Examples 19 to 21. In this example, the lens is configured to be moved in the lens mount during alignment.

Example 23 incorporates the subject matter of any of Examples 19 to 22. In this example, the lens mount is configured to be moved in the lens holder during alignment.

Example 24 incorporates the subject matter of any of Examples 19 to 23. In this example, the lens holder is configured to be moved vertically along the supporting surface.

Example 25 incorporates the subject matter of any of Examples 19 to 24. In this example, the lens holder is configured to be moved horizontally along the supporting surface.

Example 26 incorporates the subject matter of any of Examples 19 to 25. In this example, the lens holder is configured to be rotated along the supporting surface.

Example 27 incorporates the subject matter of any of Examples 19 to 26. In this example, the lens adhesive, the mount adhesive, and the support adhesive are selected to cure upon exposure to a curing light.

Example 28 incorporates the subject matter of any of Examples 19 to 27. In this example, a curing light is an ultraviolet light.

Example 29 incorporates the subject matter of any of Examples 19 to 28. In this example, an alignment is determined by a maximum intensity of a light signal.

Example 30 includes an apparatus for actively aligning an optical device. The apparatus includes means for supporting an optical device, means for mounting a lens, means for holding the lens and a mount to a supporting surface, means for determining a light intensity of a light beam through the lens, means for moving the optical device until the light intensity indicates that the lens is aligned, and means for curing an adhesive to fix the optical device in place.

Example 31 incorporates the subject matter of Example 30. In this example, the apparatus includes a means for moving the lens in the mount.

Example 32 incorporates the subject matter of any of Examples 30 to 31. In this example, the apparatus includes a means for moving the mount in a lens holder.

Example 33 incorporates the subject matter of any of Examples 30 to 32. In this example, the apparatus includes a means for moving the lens holder on the supporting surface.

Example 34 incorporates the subject matter of any of Examples 30 to 33. In this example, the apparatus includes a means for irradiating the adhesive with a blue light.

Example 35 incorporates the subject matter of any of Examples 30 to 34. In this example, the apparatus includes a means for irradiating the adhesive with an ultraviolet (UV) light.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for actively aligning an optical device, the apparatus comprising:
    the optical device, the optical device including:
        a supporting surface;
        a light source to be mounted to the supporting surface;
        a lens mount to hold a lens; and
        a lens holder to hold the lens mount, the lens mount to be mounted to the supporting surface;
    a light detector to determine a light intensity of a light beam that has passed through the lens, the light intensity to indicate an alignment of the lens, the light intensity to change based on movement of the lens;
    an alignment device to move the lens until the light intensity indicates that the lens is aligned; and
    a curing light to cure adhesive layers between the lens and the lens mount, the lens mount and the lens holder, and the lens holder and the supporting surface when the light intensity indicates the lens is aligned.

2. The apparatus of claim 1, wherein the adhesive layers are less than about 25 micrometers in thickness.

3. The apparatus of claim 1, wherein the alignment device is to move the lens relative to the lens mount during alignment of the lens.

4. The apparatus of claim 1, wherein the alignment device is to move the lens mount relative to the lens holder during alignment of the lens.

5. The apparatus of claim 1, wherein the alignment device is to move the lens holder in a first direction along the supporting surface during alignment of the lens.

6. The apparatus of claim 5, wherein the alignment device is to move the lens holder in a second direction along the supporting surface during alignment of the lens, the second direction being perpendicular to the first direction.

7. The apparatus of claim 1, wherein the alignment device is to rotate the lens holder along the supporting surface during alignment of the lens.

8. The apparatus of claim 1, wherein the curing light is a blue light.

9. The apparatus of claim 1, wherein the curing light is an ultraviolet light.

10. The apparatus of claim 1, wherein the adhesive layers are to be cured by a combination of light and heat.

11. The apparatus of claim 1, wherein a determination that the lens is aligned is based on the light detector detecting a maximum in the light intensity.

12. The apparatus of claim 11, wherein the light detector is to cause activation of the curing light in response to detection of the maximum in the light intensity.

13. The apparatus of claim 1, wherein the alignment device is capable of moving the lens in six degrees of freedom during alignment of the lens.

14. The apparatus of claim 1, wherein the alignment device is to translate the lens along a first axis, a second axis, and a third axis during alignment of the lens, the first axis being perpendicular to the second axis, the third axis being perpendicular to both the first axis and the second axis.

15. The apparatus of claim 1, further including an alignment post, a first end of the alignment post to couple to the alignment device, a second end of the alignment post to couple to at least one of the lens or the lens holder, the alignment device to move the lens via the alignment post.

16. An apparatus for actively aligning an optical device, the apparatus comprising:
    the optical device, the optical device including:
        a supporting surface;
        a light source to be mounted to the supporting surface;
        a lens mount to hold a lens; and
        a lens holder to hold the lens mount, the lens mount to be mounted to the supporting surface;
    a light detector to determine a light intensity of a light beam through the lens, the light intensity to indicate an alignment of the lens;
    an alignment device to move the lens until the light intensity indicates that the lens is aligned;
    an alignment post, a first end of the alignment post to couple to the alignment device, a second end of the alignment post to couple to at least one of the lens or the lens holder, the alignment device to move the lens via the alignment post, wherein the alignment post is to be coupled to the at least one of the lens or the lens holder via a removable adhesive; and
    a curing light to cure adhesive layers between the lens and the lens mount, the lens mount and the lens holder, and the lens holder and the supporting surface when the light intensity indicates the lens is aligned.

17. The apparatus of claim 1, wherein the lens mount includes two separate pieces.

18. The apparatus of claim 1, wherein the lens mount is a single unit including a hole or slot to hold the lens.

19. The apparatus of claim 1, wherein the lens mount includes a first tab to project beyond an edge the lens in a first direction and a second tab to project beyond the edge of the lens in a second direction different than the first direction.

20. The apparatus of claim 19, wherein the first tab and the second tab fit into slots of the lens holder.

21. The apparatus of claim 1, further including a mirror to reflect the light beam towards the light detector in response to the light beam passing through the lens.

22. The apparatus of claim 1, wherein the adhesive layers are to hold at least one of the lens, the lens mount, or the lens holder in place prior to the curing light curing the adhesive layers.

23. The apparatus of claim 1, wherein the lens is to be mounted such that a perimeter of the lens lies in a first plane that extends transverse to a second plane defined by the supporting surface.

24. The apparatus of claim 1, wherein the light source is to be positioned adjacent the lens on the supporting surface and oriented to emit the light beam through the lens.

25. The apparatus of claim 1, further including a mirror to reflect the light beam toward the light detector after the light beam has passed through the lens.

* * * * *